United States Patent
Cheng et al.

(10) Patent No.: US 9,494,732 B2
(45) Date of Patent: Nov. 15, 2016

(54) TRANSVERSAL LOAD INSENSITIVE OPTICAL WAVEGUIDE, AND OPTICAL SENSOR COMPRISING A WAVE GUIDE

(71) Applicant: Nederlandse Organisatie voor toegepast-natuurwetenschappelijk onderzoek TNO, Delft (NL)

(72) Inventors: Lun Kai Cheng, Delft (NL); Peter Martijn Toet, Delft (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 36 days.

(21) Appl. No.: 14/374,764

(22) PCT Filed: Jan. 25, 2013

(86) PCT No.: PCT/NL2013/050041
§ 371 (c)(1),
(2) Date: Jul. 25, 2014

(87) PCT Pub. No.: WO2013/112051
PCT Pub. Date: Aug. 1, 2013

(65) Prior Publication Data
US 2015/0033868 A1    Feb. 5, 2015

(30) Foreign Application Priority Data
Jan. 26, 2012 (EP) .................................. 12152724

(51) Int. Cl.
*G01B 11/16* (2006.01)
*G02B 6/036* (2006.01)
(Continued)

(52) U.S. Cl.
CPC .............. *G02B 6/036* (2013.01); *G01L 1/246* (2013.01); *G02B 6/021* (2013.01);
(Continued)

(58) Field of Classification Search
CPC .......... G02B 6/22; G02B 6/02; G02B 6/036; G01B 11/16; C03B 37/012
USPC ........................................................ 73/800
See application file for complete search history.

(56) References Cited

U.S. PATENT DOCUMENTS

| 4,427,263 A | 1/1984 | Lagakos et al. |
| 6,360,565 B1 | 3/2002 | Christoff et al. |

(Continued)

FOREIGN PATENT DOCUMENTS

WO    02/059660 A1    8/2002

OTHER PUBLICATIONS

Luyckx, et al., "Response of FBGs in Microstructured and Bow Tie Fibers Embedded in Laminated Composite," IEEE Photonics Technology Letters, vol. 21, No. 18, Sep. 15, 2009.
(Continued)

*Primary Examiner* — Lisa Caputo
*Assistant Examiner* — Octavia Hollington
(74) *Attorney, Agent, or Firm* — Knobbe, Martens, Olson & Bear, LLP

(57) ABSTRACT

A transversal load insensitive optical waveguide includes a primary section having a core. The waveguide may further include an outer cladding. The primary section includes a primary section surface and the outer cladding includes an exterior surface mechanically attached to the primary section surface by an interior cladding structure forming a mechanical connection. The cladding structure is such that for at least part of a distance between each two radial corresponding points on the exterior surface and the primary section surface respectively, the mechanical connection deviates from being radial, so that a radially-directed load on an exterior surface of the outer cladding is deflected by the cladding structure.

16 Claims, 6 Drawing Sheets

(51) Int. Cl.
　　　*G02B 6/02* (2006.01)
　　　*G01L 1/24* (2006.01)
　　　*G02B 6/34* (2006.01)
(52) U.S. Cl.
　　　CPC ..... *G02B 6/02171* (2013.01); *G02B 6/02357* (2013.01); *G02B 6/02371* (2013.01); *G02B 6/34* (2013.01); *G02B 6/02361* (2013.01); *G02B 6/02366* (2013.01); *G02B 6/03694* (2013.01)

(56) References Cited

U.S. PATENT DOCUMENTS

| | | | | |
|---|---|---|---|---|
| 6,366,722 | B1 * | 4/2002 | Murphy | G02B 6/02095 385/12 |
| 6,625,363 | B2 * | 9/2003 | Carter | C03C 25/101 359/341.1 |
| 6,826,343 | B2 * | 11/2004 | Davis | G02B 6/02042 385/126 |
| 7,120,340 | B2 * | 10/2006 | Berkey | C03B 37/01217 359/333 |
| 8,111,963 | B2 * | 2/2012 | Putnam | G02B 6/02 385/127 |
| 8,538,216 | B2 * | 9/2013 | Abernathy | G02B 6/4402 385/100 |
| 2004/0258377 | A1 | 12/2004 | Berkey et al. | |
| 2011/0170823 | A1 | 7/2011 | Xia et al. | |

OTHER PUBLICATIONS

Takeda et al., "Development of smart composite structures with small-diameter fiber Bragg grating sensors for damage detection: Quantitative evaluation of delamination length in CFRP laminates using Lamb wave sensing," Composites Science and Technology 65 (2005) 2575-2587.

International Search Report dated May 23, 2013 for PCT/NL2013/050041.

Yoji Okabe, Nobuhira Tanaka and Nobuo Takeda, "Effect of fiber coating on crack detection in carbon fiber reinforced plastic composites using fiber Bragg grating sensors," Smart Mater. Struct. 11, (2002) 892-898.

* cited by examiner

TRANSVERSAL LOAD INSENSITIVE OPTICAL WAVEGUIDE, AND OPTICAL SENSOR COMPRISING A WAVE GUIDE

This application is the U.S. National Phase of International Application No. PCT/NL2013/050041, filed Jan. 25, 2013, designating the U.S. and published in English as WO 2013/112051 on Aug. 1, 2013 which claims the benefit of European Patent Application No. 12152724.6 filed Jan. 26, 2012.

FIELD OF THE INVENTION

Transversal load insensitive optical waveguide, said waveguide comprising a primary section comprising a core, and said waveguide further comprising an outer cladding, wherein said primary section comprises a primary section surface and said outer cladding comprises an exterior surface. In addition, the present invention is directed to an optical sensor for measuring strain, comprising a wave guide as described above.

An important and major field of application of optical wave guides such as optical fibers, is the field of optical sensors for sensing a large variety of physical parameters. These parameters include strain, force, torque, displacement, vibration, temperature, and many others. In fiber based sensors, the parameters to be determined are being measured based on optical characteristics of the fiber used. These optical characteristics are for example dependent on the amount of strain applied to the fiber, enabling use of such a fiber in an optical strain sensor. It is however important that any variations or deviations from the default characteristics are primarily caused by the parameter to be measured, and preferably not by any other effect. Therefore, as will be appreciated, it is important to exclude as many as external factors as possible that may cause variations in the optical characteristics of the fiber.

Optical fibers for measuring strain are for example based on a fiber core comprising a fiber Bragg grating (FBG) enclosed within a cladding. As will be appreciated, strain on the fiber will change the periodicity of the fiber Bragg grating, providing a shift in the characteristic reflection wavelength of the grating. This may be measured providing an indication of the amount of strain applied to the fiber. Since strain is a vector, the response of the FBG depends on the direction of the strain. In general, this can be divided into the longitudinal stain and the transversal strain.

Therefore, the optical characteristics may not only be influenced by the amount of longitudinal strain in the fiber, but any radial pressure or load to the exterior of the fiber, i.e. to the cladding surface, will generate transversal strain causing a deformation of the fiber core. This limits the field of application of such fibers for accurate measurement of longitudinal strain, since situations wherein an unequal distribution of pressure over the length of the fiber are to be avoided. Because for a FBG, this will lead to unequal change in the local period of the grating and causes distortion in the reflection wavelength characteristic.

SUMMARY OF THE INVENTION

It is the object of the present invention to provide an optical wave guide which is insensitive to transversal load. In particular, it is an object of the present invention to provide an optical wave guide of which the optical characteristics are largely insensitive to transversal load.

The invention thereto provides a transversal load insensitive optical waveguide, said waveguide comprising a primary section comprising a core, and said waveguide further comprising an outer cladding, wherein said primary section comprises a primary section surface and said outer cladding comprises an exterior surface mechanically attached to said primary section surface by means of an interior cladding structure forming a mechanical connection, and wherein said cladding structure is such that for at least part of a distance between each two radial corresponding points on said exterior surface and said primary section surface respectively, said mechanical connection deviates from being radial, for in use deflecting a radial directed load on an exterior surface of said outer cladding by means of said cladding structure.

In the optical wave guide with accordance with the present invention, the exterior surface of the wave guide, which is formed by the outer surface of the outer cladding, is separated from the primary section surface by means of a cladding structure. The cladding structure forms the mechanical connection between the exterior surface of the wave guide and the primary section surface.

The primary section of the fiber, according to a preferred embodiment, further comprises a primary cladding enclosing said core. For a proper operation of a step-index waveguide, the primary cladding surrounding the core within the primary section is preferably homogeneous. The skilled person may appreciate that in certain application, at the choice of the designer, the present invention leaves the liberty of using a primary section having a core without a primary cladding. However, in most cases a primary section comprising a core and a primary cladding in accordance with the present embodiment, will be a desired and (from a technical perspective) preferred choice.

In accordance with the principles of the present invention, the mechanical connection between the exterior surface and the primary section surface is such that for each point on the exterior surface and the radially corresponding point on the primary section surface, a direct radial connection between these two points is absent for at least part of the distance between the two point: i.e. the mechanical connection between the two radial corresponding points on the exterior surface and the primary section surface deviates from being radial for at least a part of the distance between these points. As a result, any radial load exerted on the exterior surface of the wave guide will be deflected by the mechanical connection in the direction which is primarily not radial (or deviates from being radial) on the primary section surface. This therefore avoids radial load to be exerted on the core, thereby preventing undesired deformations that may influence optical properties and characteristics.

For a well understanding of the measures of the present invention, it is important to realize that the term 'radial' is not different from what is generally understood by the skilled person in relation to a cylindrical coordinate system: the radial direction being the direction pointing directly to the center of the core of the wave guide (or geometrically the opposite direction). Moreover, two points on the exterior surface and the primary section surface respectively are considered to be radial corresponding points in case there exists a line which is transverse to the exterior surface and the primary section surface, which line intersects with both these points. Such a line as a result of this definition also intersects with the center axis through the optical wave guide.

As will be appreciated, since in reality the exact orientation of the exterior surface or the primary section surface may deviate from being perfectly cylindrical, even though an attempt is made in the manufacturing process to provide an accurately cylindrical fiber having a cylindrical core, it will be appreciated that the definitions provided should be interpreted functionally. As a result, two respective points on the exterior surface and the primary section surface fall within the definition 'radial corresponding points' in case under ideal circumstances such points would be counted as being radially corresponding points. In other words, the definition includes any two points being radial corresponding points, while taking into account any imperfections from the ideal case in reality. This of course holds for any strict geometric definition when applied to a real optical wave guide comprising imperfections.

As a result of the mechanical connection between two radial corresponding points on the exterior surface and the primary section surface respectively, which for at least a part of the distance between these two points deviates from being radial, any radially exerted load on the exterior surface of the optical wave guide will be deflected by the cladding structure, such that the force exerted on the primary section surface if any) deviates from being radial. As a result, a radial exerted load on the exterior surface of the outer cladding will not result in a direct radial deformation of the primary section (and thereby the core) of the wave guide (or such a local deformation will be reduced or limited as much as possible). This yields an optical wave guide of which the optical characteristics are to a great deal insensitive to any radial load exerted on the exterior surface of the wave guide. Such an optical wave guide may beneficially be used for providing an optical sensor which is based on measuring deviations in the optical characteristics of a wave guide, such as an optical sensor for measuring strain.

In an embodiment of the present invention, the optical wave guide may for example comprise a fiber Bragg grating structure incorporated in the core thereof. A fiber Bragg grating may for example be formed by a periodic profile of varying refractive index, e.g. created by means of density variations or variations of the chemical structure. As a result of the periodicity of the profile certain wavelength or a range of wavelengths may be reflected in the optical wave guide while other wavelengths are simply transmitted. As will be appreciated, by illuminating the wave guide with a light source, such as a laser, and by measuring the reflected or transmitted wavelengths, information is achieved about the periodicity of the fiber Bragg grating. If the wave guide is used as a strain sensor, by varying the amount of strain to the optical fiber (e.g. by pulling at both ends of the fiber), the periodicity of the fiber Bragg grating slightly changes resulting in a variation in the reflected (or transmitted) wavelengths. This wavelength shift can be detected, and thereby provides a direct measure for the amount of strain present in the wave guide. However, in case the primary section and hence the core of the wave guide is deformed under influence of a radial load, such as a force or pressure exerted on the primary section, the periodicity of the fiber Bragg grating may also change, resulting in a wavelength shift.

With the transversal load insensitive wave guide of the present invention, any radial exerted load on the exterior surface of the wave guide will be effectively deflected such that exertion of a radial force on the primary section of the wave guide is prevented. Dependent on the embodiment of the present invention, deflection of the radial exerted load may result in the force being deflected completely away from the primary section (ideally), or the exertion of a force which is not radially directed, such as a tangential force. For example a tangential force may, dependent on the embodiment, result in torsion of the primary section, but primarily leaves the form of the core and the periodicity of fiber Bragg grating mostly in tact. As a result, variations in the optical characteristics of the wave guide are down to a minimum.

According to an embodiment of the present invention, the cladding structure comprised one or more rib portions running in an axial direction along said primary section, wherein said ribs extend from said primary section surface in a direction nonaligned with a centre of said primary section. In other words, the ribs extend from the primary section surface in a direction which deviates from being radial. According to a specific embodiment hereof, the one or more rib portions extend obliquely from the primary section surface, for in use converting a radial load exerted on the exterior surface substantially into a tangential force on the primary section surface. As a result, as explained here and above, the primary section may at most experience a tordation. The effects of torsion of the primary section on the optical characteristics for measuring strain are only limited. This is due to the effect that tordation results in a rotation symmetric deformation (thereby compensating the effects) with also a very limited effect on the optical characteristics.

In particular, according to a further embodiment hereof, the one or more rib portions are arranged between a primary section and a jacket of the outer cladding enclosing the primary section, separating the primary section from the jacket. In this embodiment, the one or more ribs therefore obliquely extend from the primary section surface to the jacket enclosing the primary section. Any radial force on the jacket is deflected through the ribs into a tangential force on the primary section surface.

According to a further improvement of this embodiment, the outer cladding may comprise a plurality of concentric jackets, wherein each of the jackets is attached to a contiguous inner jacket or to the primary section surface by means of one or more rib portions extending obliquely from an outer surface of the inner jacket or the primary section surface. This will provide a layered structure of jackets with interposed obliquely oriented ribs.

The skilled person may appreciate that various types and sorts of configurations are possible for the design and orientation of the ribs in between the primary section surface and the concentric jackets, or in between each of the jackets. The most straight forward configuration is a configuration wherein all of the ribs are oriented in a more or less similar angle with respect to the transverse direction to the primary section surface. However, it is also possible that a first group of ribs is oriented obliquely under a first angle, and a second group of ribs is oriented obliquely under a second angle. These angles may for example be opposite angles. Groups of same or differently oriented ribs may be present in between each two contiguous jackets (in case of a configuration with multiple concentric jackets) or the primary section surface and the first jacket. It is also possible that all ribs in between the primary section surface and the first jacket are oriented under a same angle, while all ribs in between a first and a second (or further) jacket may be oriented under a second angle different from the first angle.

According to a further embodiment of the present invention, the outer cladding structure comprises at least a first jacket and at least a second jacket in a concentric arrangement enclosing the primary section, wherein the primary section and the first jacket are separated by at least two first ribs and wherein the first and the second jacket being separated by at least two second ribs. The first and second ribs in this embodiment running in an axial direction relative to the primary section. In cross section to the wave guide, according to this embodiment, the first ribs and the second ribs extend from different angular positions from the primary section surface and the first jacket respectively. Herein, the term angular position, as will be appreciated by the skilled reader, is to be interpreted within the terminology of a cylindrical coordinate system defining an axial coordinate axis, a radial coordinate axis, and an angular position.

According to a specific embodiment of the above mentioned embodiment, the first and second ribs extend from angular positions transfer to each other. This yields a particular configuration wherein exactly two ribs extend from the primary section surface to the first jacket, and exactly two ribs extend from the first jacket to the second jacket. The first two ribs extending from the primary section surface to the first jacket are oriented transfers to the second two ribs from the first jacket to the second jacket. This causes a radial load to the exterior surface of the outer cladding to result in only a deformation of the outer cladding, and hardly any deformation of the primary section. This can be understood by mechanically considering two cases: the first case being a radial load exerted on the exterior surface exactly above one of the ribs between the first jacket and the second jacket. The second case being a radial load exerted on the exterior surface exactly above one of the ribs between the primary section surface and the first jacket. In the first case, the load exerted on the exterior surface will result in a deformation of the ribs extending in between the primary section surface and the first jacket. Although this may lead to the primary section being shifted off axis, it will not result in a deformation of the primary section and hence the core. In the second case, exerting the force on the exterior surface results in a deformation of the second ribs running between the first jacket and the second jacket, this yields no deformation at all of the primary section of the wave guide.

According to a further improvement of the above described embodiment, the first rib and the second rib extend in a radial direction from the primary section surface and the first jacket respectively. However, it is also possible, according to a further embodiment, that the first ribs or the second ribs extend obliquely, relative to a tangential direction at an attachment position of the ribs from the primary section surface and the first jacket respectively. As will be appreciated, the latter provides a sort of hybrid embodiment containing features of earlier described embodiments of the optical wave guide of the invention.

Preferably, the optical wave guide in accordance with the present invention is arranged for use in an optical sensor arrangement. As will be appreciated, the present invention provides benefits in any application wherein a radial load on the exterior surface of the wave guide results, for conventional wave guides, in a detrimental variation in the optical characteristics of the wave guide. A particular application is described extensively throughout this application, in the form of a wave guide for an optical sensor to measure longitudinal strain. Such a sensor may for example be applied for monitoring structural integrity of certain objects. For example, a fiber based optical strain sensor of this kind may be applied to the blades of a wind turbine to monitor its structural integrity throughout its lifespan. In particular for this application, it is important to monitor the structural integrity of the blades, since for example the breaking of such blades are likely to cause catastrophic damage to the turbine itself or his direct surroundings. However, many other applications can be thought of, such as integrity monitoring of the wings of a glider plane on a hull of a boat or in more complex force sensing applications.

According to a second aspect of the present invention, there is provided an optical sensor for measuring strain, comprising a wave guide as described above. In particular, according to an embodiment, the optical sensor according to this second aspect comprises light source for providing an optical signal, and means for detecting a return optical signal reflected or transmitted by said waveguide, wherein the waveguide is arranged for receiving said optical signal.

BRIEF DESCRIPTION OF THE DRAWINGS

The invention will further be explained by means of some specific embodiments thereof with reference to the enclosed drawings, wherein.

DETAILED DESCRIPTION

Figure 1:
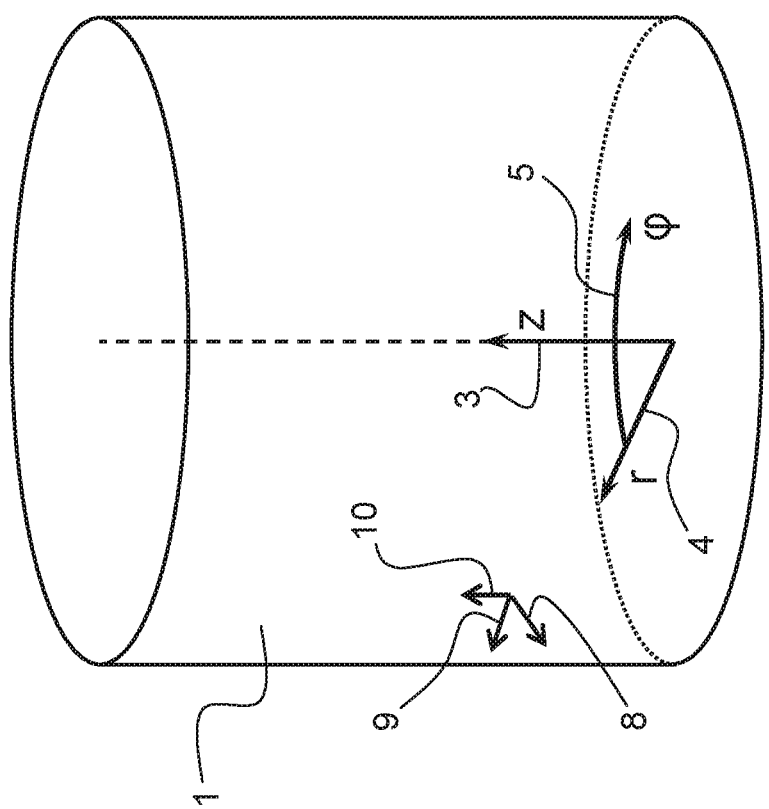
FIG. 1 schematically illustrates a cylindrical coordinate system known to the skilled person.

For illustrated and explanatory purposes only, FIG. 1 schematically illustrates a cylindrical coordinate system known to the skilled person, and as used for defining specifics of the present invention.

The cylindrical coordinate system is schematically illustrated by the axial/longitudinal axis 3, geometrically denoted with coordinate parameter z, and the radial axis 4 geometrically related to coordinate parameter r. The circular axis 5 defines the angular position geometrically indicated by coordinate parameter $\phi$. Any point on a cylinder 1 may be defined by means of its coordinates (z, r, $\phi$) defining respectively the axial position, the radial position, and the angular position on the cylinder 1. As known to the skilled person, the cylindrical coordinate system is in particular useful for defining three dimensional geometrical structures, comprising a rotational symmetry about a longitudinal axis (z). In FIG. 1, the cylinder 1 illustrated and defined by its surface 1 also shows the transversal direction 8 relative to the surface 1, and the tangential directions 9 and 10 of the surface.

In FIGS. 2 through 5, a number of embodiments of an optical wave guide in accordance with the present invention are illustrated in cross section. It is to be understood that, making reference to the cylindrical coordinate system illustrated in FIG. 1, the FIGS. 2 through 5 each show a cross section of an optical wave guide at a fixed axial coordinate z. In each of the FIGS. 2 through 5, the axial direction is the direction perpendicular to the paper.

Figure 2:
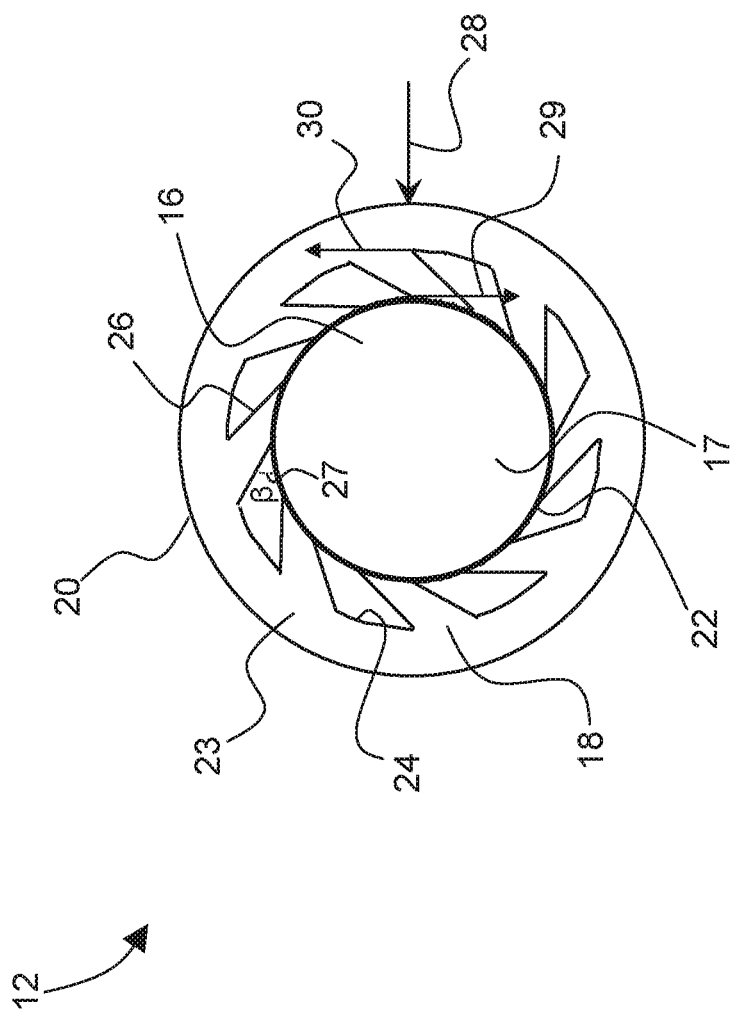
FIG. 2 schematically illustrates a cross section of a first embodiment of the optical wave guide in accordance with the invention.
Figure 3:
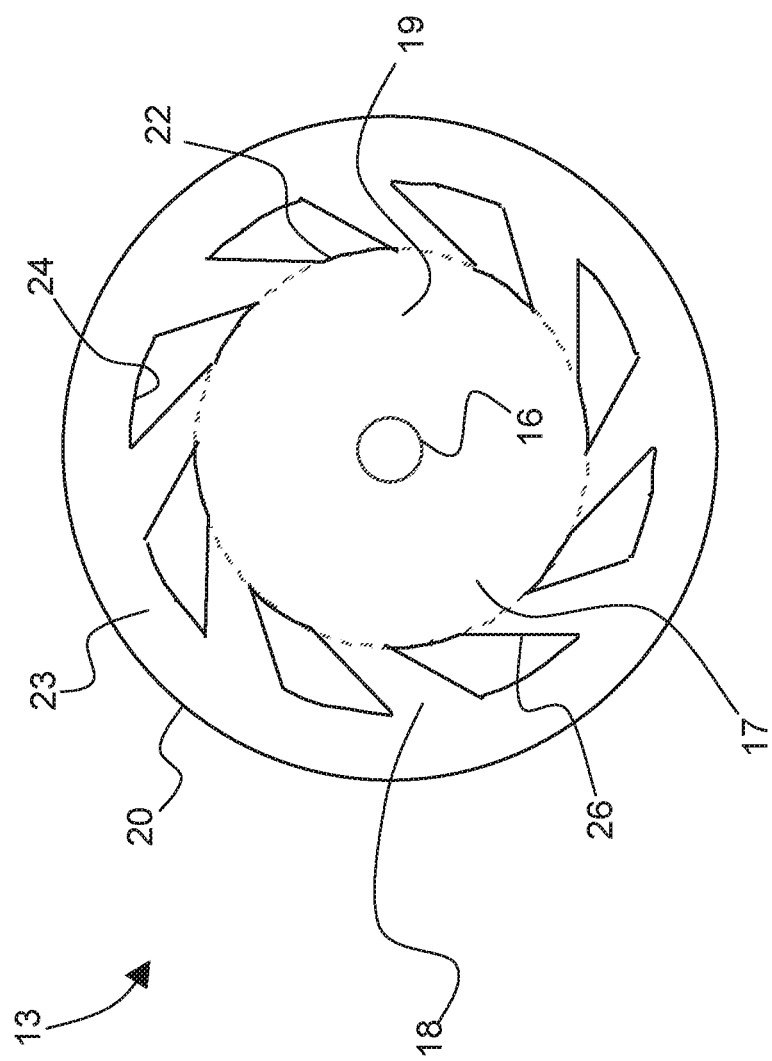
FIG. 3 schematically illustrates a cross section of a second embodiment of an optical wave guide of the invention.

In FIG. 2, a first embodiment of an optical wave guide 12 in accordance with the present invention is schematically illustrated. In this first embodiment, the optical wave guide or fiber 12 comprises a primary section 17 and an outer cladding 18. In the embodiment of FIG. 2, the core 16 of the fiber 12 is formed by the primary section 17. However, the skilled person will appreciate that the core 16 will usually be enclosed by an inner cladding (not shown) which is part of the primary section 17 for providing the suitable and desired optical wave guiding and corresponding properties to the fiber 12. Such an embodiment is illustrated in FIG. 3 and will be discussed further on below.

In FIG. 2, the primary section 17 comprises a primary section surface 22 which is mechanically connected to an exterior surface 20 of the fiber 12 by means of the outer cladding 18 having a specific cladding structure. The cladding structure of outer cladding 18 comprises a first jacket 23 concentrically surrounding the primary section 17 of the fiber 12. The first jacket 23 comprises an interior jacket surface 24 which is facing the primary section surface 22. The outer surface 20 of the first jacket 23 forms the exterior surface 20 of the fiber 12.

The first jacket 23 is connected to the primary section 17 by means of a plurality of ribs 26. All of the ribs 26 extend along side the primary section surface 22 in the axial direction. At the same time, the ribs 26 extend obliquely under an angle β, which is generally indicated by reference numeral 27, from the primary section surface 22 to the inner jacket surface 24.

As a result of the obliquely oriented ribs extending from the primary section surface 22 to the inner jacket surface 24, in between the primary section 17 and the exterior surface 20, a radial oriented load schematically indicated by force 28 on the exterior surface 20 of the fiber of the present invention results in forces 29 and 30 on the primary section surface 22 and the inner jacket surface 24 respectively, forming a torque. As a result, instead of a local radial oriented deformation of the primary section 17, a torsion force is exerted on the primary section 17 which may result in a local twist of the primary section 17 relative to the exterior surface 20. The effect on the optical characteristics of the primary section 17, if any, are only marginal compared to the effect of a radial deformation of the primary section 17. In particular in applications wherein the core 16 comprises a fiber Bragg grating formed by periodic variations of the index of refraction of the core 16 in the axial direction, it can be understood that local radial deformation of the primary section 17 causes local stretching of the primary section 17 resulting in a variation in the periodical structure of the fiber Bragg grating in the core 16. Therefore, a local radial deformation of the primary section 17 has a relatively large influence on the periodics of the fiber Bragg grating and thereby on the wave length of the reflective part of the optical signal. On the other hand, twisting the primary section 17 instead of causing a radial deformation will only have a very limited effect on the periodic structure of the fiber Bragg grating. As a result, the effects of a radial exerted force such as a radial load 28 on the exterior surface 20 of the fiber 12 of FIG. 2 on the optical characteristics of primary section 17 will be marginal as compared to a conventional fiber used for these purposes.

A further embodiment of a fiber 13 in accordance with the present invention is illustrated in FIG. 3. The reference numerals of FIG. 3 are identical to the reference numerals used in FIG. 2 where these refer to same or similar elements of the present embodiment. Fiber 13 comprises a primary section 17 and an outer cladding 18. The primary section 17 comprises a core 16 which is enclosed by an outer core jacket or primary cladding 19 comprising the primary section surface 22. The cladding structure of (outer) cladding 18 further comprises a first jacket 23 comprising an inner jacket surface 24 and, similar to the embodiment in FIG. 2 rib portions 26 extending in between the primary section surface 22 and the inner jacket surface 24, obliquely oriented under an angle relative to the primary section surface 22. The ribs 26 extend from different angular positions on the primary section surface 22 and further extend in the axial direction along the primary cladding 19 and primary section surface 22 of the fiber 13. The main difference with the embodiment of FIG. 2 is that the primary section 17 of the fiber 13 of FIG. 3 comprises the primary cladding 19 in between the core 16 and the primary section surface 22.

Figure 4:
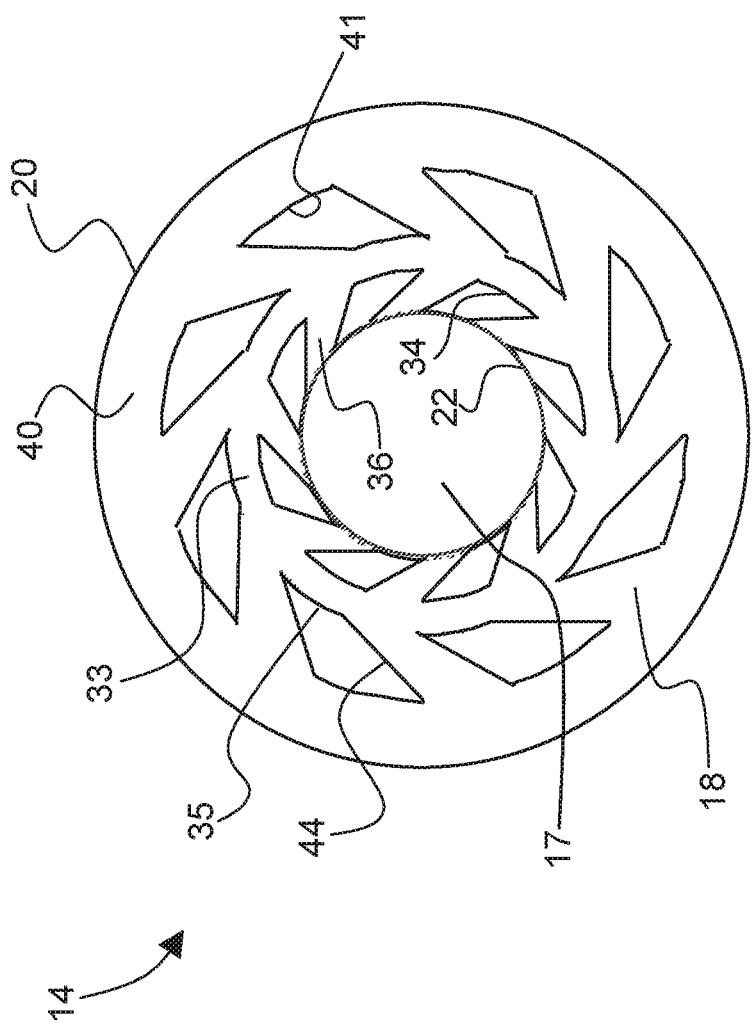
FIG. 4 schematically illustrates a cross section of an optical wave guide in accordance with a third embodiment of the present invention.

FIG. 4 illustrates a further embodiment of the present invention. In FIG. 4, fiber 14 comprises a primary section 17 (comprising at least a core (not shown)) and an outer cladding 18, wherein the cladding structure of outer cladding 18 is rather complex comprising a plurality of concentric jackets (33 and 40). Fiber 14 in particular comprises first jacket 33 having a first inner jacket surface 34 and a first outer jacket surface 35. Ribs 36 extend obliquely from the primary section surface 22 in between the primary section surface 22 and the first inner jacket surface 34. Again, these ribs 36 also extend in the axial direction along the primary section 17 of fiber 14.

A second jacket 40 on the outer side thereof forms the exterior surface 20. The second jacket 40 further comprises a second inner surface 41 which faces the first outer surface 35 of the first jacket 33. In between the first outer surface 35 and the second inner jacket surface 41, a plurality of obliquely oriented ribs 44 connect the second jacket 40 with the first jacket 33. The ribs 44 obliquely extend from the first outer jacket surface 35 to the second inner jacket surface 41. Again, the ribs 44 also extend in the axial direction along the length of the fiber 14. As will be appreciated, as a result of the additional layer formed by second jacket 40, and the cylindrical symmetric and 'featherlike' orientation of the ribs 36 and 44 obliquely oriented with respect to the primary section surface 22, the first inner jacket surface 34, the first outer jacket surface 35 and the second inner jacket surface 41, the cladding structure provides additional resiliency. A radial load exerted on the outer surface 20 of the fiber 14 will result in a twisting force on the first jacket 33. As a result of the cladding structure of outer cladding 18, torsion of the first jacket 33 will cause the diameter of outer cladding 18 to reduce: shrinking the fiber about its circumference.

Figure 5:
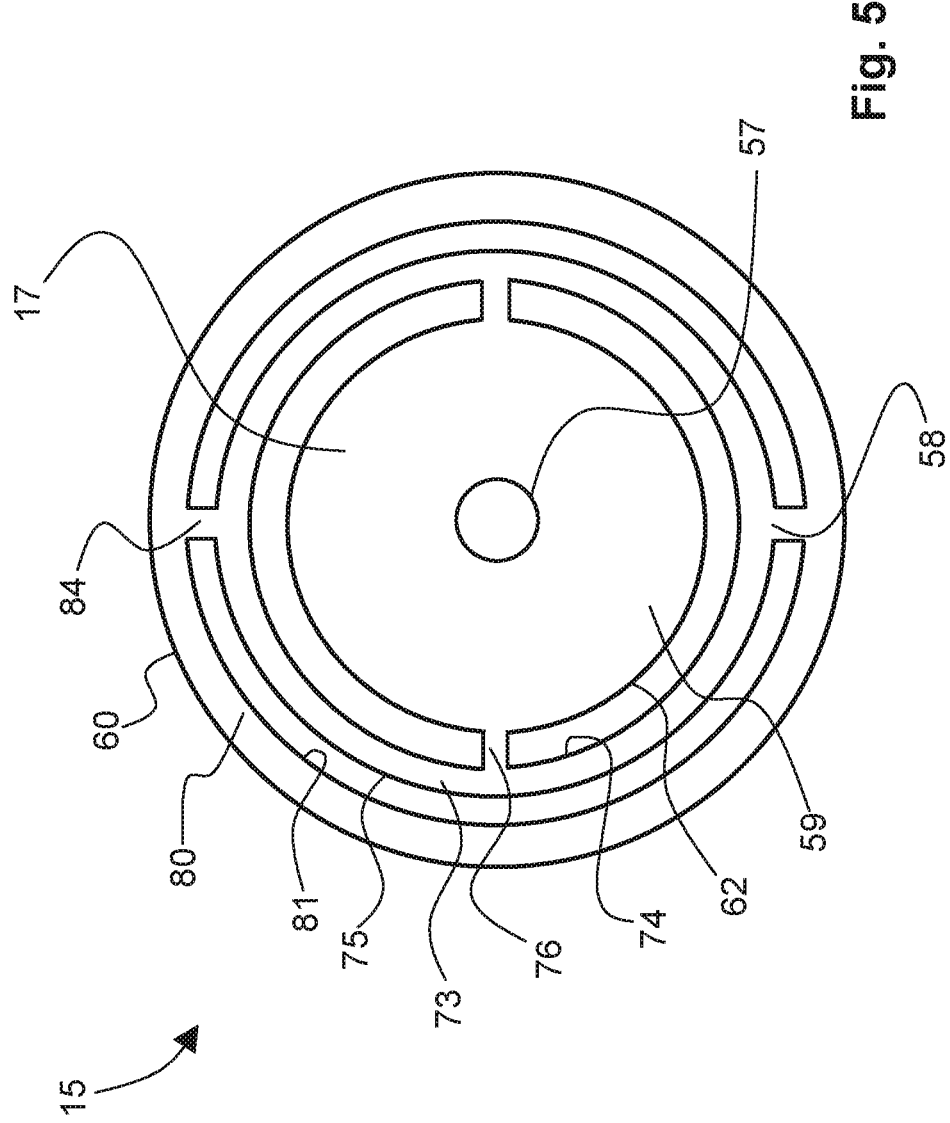
FIG. 5 schematically illustrates a cross section of an optical wave guide in accordance with a fourth embodiment of the present invention.

A further embodiment of the present invention is illustrated in FIG. 5. Fiber 15 comprises an primary section 17 comprising a core 57 and an outer core jacket or primary cladding 59. The primary cladding 59 comprises the primary section surface 62. The outer cladding 58 has a cladding structure comprising a first jacket 73 and a second jacket 80.

The first jacket 73 comprises a first inner jacket surface 74 facing the primary section surface 62. The first jacket 73 further comprises a first outer jacket surface 75 facing a second inner jacket surface 81 of second jacket 80. The first jacket 73 is connected to the primary cladding 59, in particular the primary section surface 62 thereof, by means of two ribs 76 extending transfers from the primary section surface 62. The ribs 76 extend from opposite angular positions on the primary section surface 62 on both sides of the primary section 17. In the embodiment of FIG. 5, the first jacket 73 is only connected to the primary section surface 62 by means of two ribs. The skilled person may appreciate that the number of ribs may be increased, although for the functioning of the embodiment illustrated in FIG. 5 it is preferred to use just two or may be even only one rib.

The second jacket 80 is mechanically connected to the first jacket 73 by means of two ribs 84 extending in between the first outer jacket surface 75 and the second inner jacket surface 81, transfers to the first outer jacket surface 75. Again, in the embodiment of FIG. 5, only two ribs 84 are present for connecting the second jacket to the first jacket 73. Similar to what is explained above, again the number of ribs may be increased but it has been experienced that the use of two ribs provides a preferred embodiment. Also, the number of ribs may even be reduced to just one rib, although this may yield a cladding structure which is too flexible for certain applications. The outer surface of second jacket 80 forms the exterior surface 60 of the fiber 15.

Due to the perpendicular orientation of the first ribs 76 with respect to the second ribs 84, any force on the exterior surface 60 will decompose into forces in the interior cladding structure which deviates from being radial to the primary section 17. This will be explained by means of two examples. A radial force exerted on the exterior surface exactly at the angular position of one of the ribs 84 will be exerted by means of two perpendicular forces on either side of the core of fiber 15 at the locations of ribs 76. The forces are perpendicular to the specific orientation of the ribs 76, thereby being tangentially oriented with respect to the primary section surface 62. The radial exerted force on the exterior surface 60 will thus be translated into an off axis translation of the outer cladding 18 with respect to the primary section 17. However, a local radially oriented deformation is effectively prevented.

In a second example, a radial oriented force is exerted on the primary section surface exactly above one of the ribs 76 of the fiber 15. A local radial deformation of the second jacket 80 will be the effect of the radially exerted force. At the same time, the force will be exerted by means of two tangentially oriented forces at the locations of ribs 84, causing merely a slide deformation of the first jacket 73. At the same time a local radial deformation of the primary section 17 is effectively prevented.

Although not specifically mentioned in any of the embodiments illustrated in FIGS. 2 through 5, it will be appreciated that the space in between the ribs and any two concentric surfaces within the cladding structure of the outer claddings (18, 58) of the embodiments illustrated may be filled with a suitable fluid, such as air or another suitable gas or gas composition, or a liquid and the shape is not limited to the shapes as shown.

FIGS. 6a through 6c provide again some schematic illustrations of embodiments of the present invention. The embodiments are illustrated graphically dependent on their angular position φ and their radial coordinate r. The figures are merely illustrated for explanatory purpose only and the dimensions and distances illustrated in each of the FIGS. 6a through 6c should not be regarded as a limitation of the embodiments to certain dimensions. As will be appreciated, the illustrations are made dependent on their angular position provided by coordinate φ, wherein φ=0 and φ=2π. φ resemble the same angular position (the embodiments being rotational symmetric about the z axis).

Figure 6A:
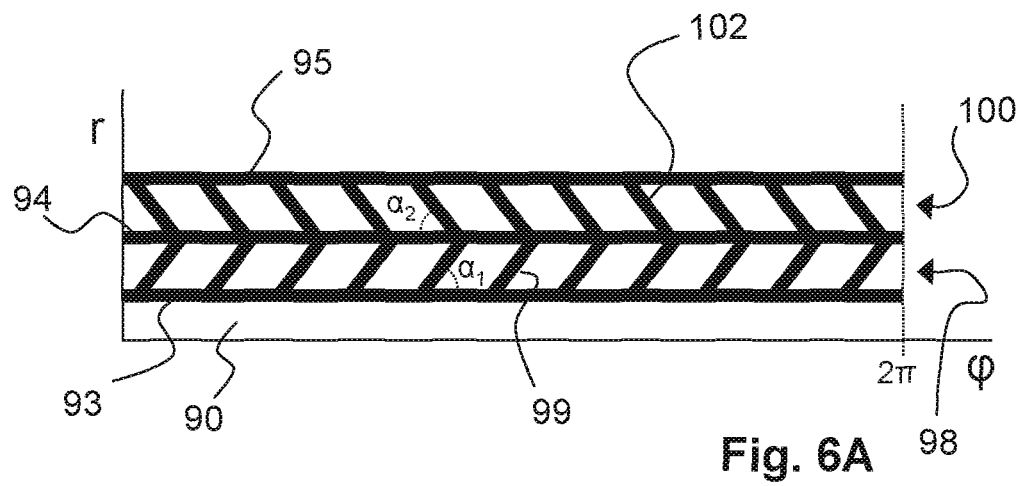
FIG. 6a-6c schematically illustrate cladding structures in terms of the coordinates in a cylindrical coordinate system according to various embodiments of the optical wave guide of the present invention.

In FIG. 6a, the primary section is illustrated with reference numeral 90. The primary section 90 comprises a primary section surface 93. The cladding structure further comprises a first jacket 94 and a second jacket 95. In between the primary section surface 93 and the first jacket 94, a first group of ribs generally indicated with arrow 98 mechanically connect the first jacket 94 to the primary section surface 93. The second group of ribs generally indicated by arrow 100 connects the first jacket 94 mechanically to the second 95. The ribs, such as rib 99, of the first group of ribs 98 form an angle α1 with the primary section surface 93. At the same time, the second ribs 102 of the second group 100 form an angle α1 with the first jacket 94. In the illustration of FIG. 6a, α1=α2, although the orientation of the angle is opposite to the normal (transverse direction to surface 93 and jacket 94). As will be appreciated angles α1 and α2 may be different in magnitude according to specific embodiments.

Figure 6B:
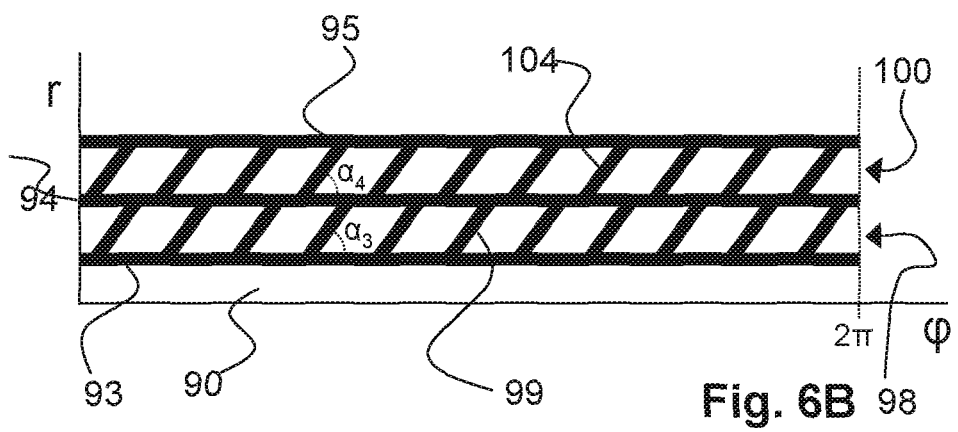

In FIG. 6b, ribs 99 of the first group 98 extend under an angle α3 from the primary section surface 93. Ribs 104 of the second group 100 extend under an angle α4 from the first jacket 94. In FIG. 6b, α3=α4 and both angles are oriented in the same direction relative to the normal. As will be appreciated, the angles α3 and α4 may be different in magnitude.

Figure 6C:
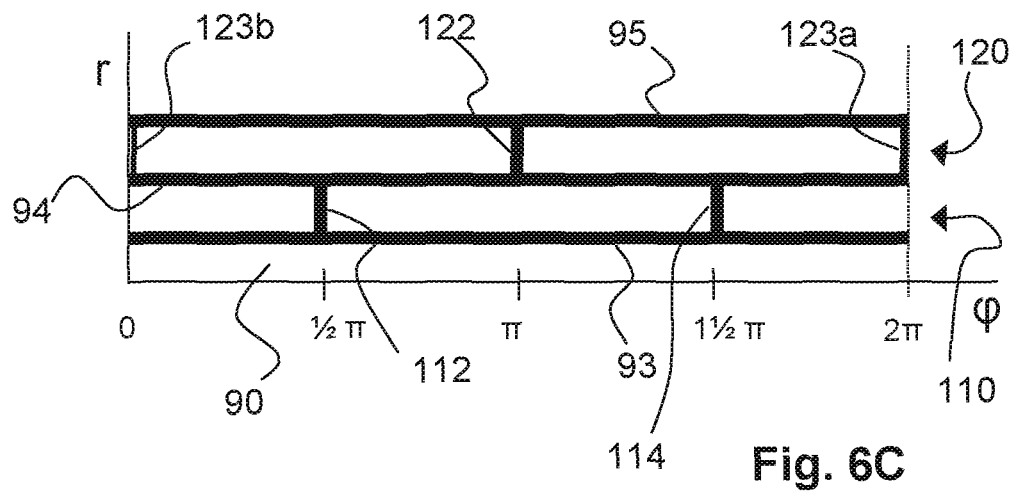

In FIG. 6c a schematic illustration is depicted which corresponds to the embodiment which is also shown in FIG. 5. In between the primary section surface 93 and the first jacket 94, ribs 112 and 114 of the first group 110 extend transfers to the primary section surface 93 to the first jacket 94. In between the first jacket 94 and the second jacket 95, ribs 122 and 123 formed by 123a and 123b (bearing in mind that angular position φ=0 equals φ=2π) form the mechanical connection between the first jacket 94 and the second jacket 95. Ribs 112, 122, 114 and 123 extend from angular positions ½π, π, 1½π and 2π respectively.

As will be appreciated, further embodiments of the present inventions may be comprised of additional jackets which are somehow mechanically connected in accordance with the principles of the present invention for deflecting a radial exerted force on the exterior surface away from the primary section.

Optical wave guide in accordance with the principles of the present invention, as a result of being insensitive to radial/lateral load on the exterior surface of the wave guide or fibers, may be suitably embedded into any material for measuring the induced strain inside an object in the longitudinal/axial direction of the fiber. As will be appreciated, by embedding the fibers in accordance with the present invention at different depths inside the material layer, strain in the material dependent on the depth can be determined.

The invention allows structural health monitoring of structures made with inhomogeneous material or composite structures, such as wind turbine blades, ships, airplanes, space constructions, liquid natural gas (LNG) vessels and the like. Moreover, the principles of the invention providing a transversal or radially directed load insensitive optical wave guide may beneficially be applied in other field of use. In particular, the fact that the optical characteristics of the fiber are to a great extent less sensitive to any transversal or radially directed load exerted on the exterior surface of the wave guide, enables application of the wave guide in accordance with the present invention in all kinds of optical sensor systems based on optical wave guide.

Due to the principles of the present invention as defined in the claims, the reflection spectrum of a fiber Bragg grating in a fiber based on the solution presented will maintain its profile even for inhomogeneous radial/lateral load distribution along the grating. This makes fiber Bragg grating's embedded in homogeneous materials and inhomogeneous materials, like composite, usable for strain measurement using this fiber, in particular in the longitudinal direction. Embedding such fibers enables strain to be measured inside the structure itself, instead of only at the surface of a structure.

The deflection of a local radial oriented load results into a rotation or movement of the primary section, in accordance with one embodiment of the invention, or a deformation or translation of only the outer cladding relative to the primary section, in accordance with another embodiment of the invention, rather than into an actual longitudinal strain of the primary section. This is a mechanical solution for an optical problem.

In conventional wave guides, lateral load to a conventional optical fiber will cause a strain in the actual longitudinal direction due to the Poisson effect. An inhomogeneous lateral load distribution along a conventional optical fiber may occur when the optical fiber is embedded in an inhomogeneous material. The axial strain caused by this load changes the periodicity of an incorporated fiber Bragg grating, rendering such a conventional optical wave guide to be unsuitable for embedding into such a material.

The problem however for conventional wave guides may not be limited to use of such wave guides embedded in inhomogeneous material, but may also occur when the fiber is attached to the surface of a material, in particular where such a surface comprises or is formed by small structural features such as indentations or undulations.

In the present invention, the wave guide or fiber consists of an inner part including the primary section of the optical fiber and an outer part including the outer cladding. The two parts are connected by mechanical structures, e.g. a cladding structure, along the fiber, which are oriented significantly not to the center of the inner part: deviates from being radial. The mechanical structures jointly transfer a radial compression of the outer tube to a movement (e.g. a rotation or translation) of the inner part with respect to the outer part, without a compression/deformation of the inner part. This will reduce the generation of longitudinal strain in the primary section and hence the core of the optical fiber significantly. The fiber Bragg grating in this wave guide or fiber in accordance with the principle of the invention will remain its period under inhomogeneous lateral load distribution. This will provide a well defined reflection spectrum of an optical signal which is only dependent on 'global' strain within the "whole" fiber. When the whole fiber is stretched, the cladding structure ensures the actual strain transfer between the outer and inner parts. The fiber may also be used in combination with a fiber laser for solving the same problem.

As will be appreciated by the skilled person, the exact configuration of the cladding structure and the wave guide may be optimized within the teachings of the present invention, e.g. by optimizing the number of ribs extending between contiguous layers and jackets within the fiber. Further, the shape of the rib portions is not limited to the examples as shown. Also additional layers, additional jackets, and additional ribs may be added to the fiber without departed from the principles of the invention. Although use of the wave guide in a strain sensor has been extensively described herein, the skilled person will appreciate that an optical wave guide which is insensitive to local external load may be applied in other situations, and different fields of use.

The embodiments described herewith and illustrated in the drawings are rather intended for illustrated purposes, and are not by any manner or means intended to be restrictive to the invention. The context and scope of the invention discussed here is only restricted by the scope of the appended claims.

What is claimed is:

1. An optical waveguide, said waveguide comprising a primary section comprising a core, and said waveguide further comprising an outer cladding, wherein said primary section comprises a primary section surface and said outer cladding comprises an exterior surface mechanically attached to said primary section surface by means of an interior cladding structure forming a mechanical connection, and wherein said cladding structure is such that for at least part of a distance between each two radial corresponding points on said exterior surface and said primary section surface respectively a direct connection in a radial direction via the cladding structure is absent, such that said mechanical connection deviates from being radial, for in use deflecting a radial directed load on an exterior surface of said outer cladding by means of said cladding structure.

2. The optical waveguide according to claim 1, wherein said primary section further comprises a primary cladding enclosing said core.

3. The optical waveguide according to claim 1, said cladding structure comprising one or more rib portions running in an axial direction along said primary section, wherein said ribs extend from said primary section surface in a direction different from said radial direction.

4. The optical waveguide according to claim 3, wherein said one or more rib portions extend obliquely from said primary section surface, for in use converting a radial load on said exterior surface substantially into a tangential force on said primary section surface.

5. The optical waveguide according to claim 3, wherein said rib portions are arranged between said primary section and a jacket of said outer cladding enclosing said primary section, separating said primary section from said jacket.

6. The optical waveguide according to claim 5, said outer cladding comprising a plurality of concentric jackets, wherein each of said jackets is attached to a contiguous inner jacket or said primary section surface by means of one or more rib portions extending obliquely from an outer surface of said inner jacket or said primary section surface.

7. The optical waveguide according to claim 1, wherein said cladding structure comprises at least a first jacket and at least a second jacket in a concentric arrangement enclosing said primary section, said primary section and said first jacket being separated by at least two first ribs, and said first and said second jacket being separated by at least two second ribs, said first and second ribs running in axial direction relative to said primary section, wherein in cross section of said waveguide, said first ribs and said second ribs extend from different angular positions from said primary section surface and said first jacket respectively.

8. The optical waveguide according to claim 7, wherein said first and second ribs extend from angular positions transverse to each other.

9. The optical waveguide according to claim 7, wherein said first ribs or said second ribs extend in a radial direction from said primary section surface and said first jacket respectively.

10. The optical waveguide according to claim 7, wherein said first ribs or said second ribs extend obliquely, relative to a tangential direction at an attachment position of said ribs from said primary section surface and said first jacket respectively.

11. The optical waveguide according to claim 10, wherein said first ribs extend in a first oblique direction, and said second ribs extend in a second oblique direction, wherein said first oblique direction and said second oblique direction are opposite oblique directions forming an opposite angle relative to a radial direction from said primary section surface and first jacket respectively.

12. The optical waveguide according to claim 1, said optical waveguide being arranged for use in optical sensor arrangements.

13. The optical waveguide according to claim 1, wherein said core comprises a grating structure for enabling optical measuring of strain of said waveguide.

14. The optical waveguide according to claim 13, wherein said grating structure comprises a fiber Bragg grating structure.

15. An optical sensor for measuring strain, comprising the waveguide in accordance with claim 1.

16. The optical sensor according to claim 15, said sensor further comprising light source for providing an optical signal, and means for detecting a return optical signal reflected or transmitted by said waveguide, wherein the waveguide is arranged for receiving said optical signal.

* * * * *